(12) United States Patent
Lee (10) Patent No.: US 8,259,801 B2
(45) Date of Patent: Sep. 4, 2012

(54) METHODS FOR CODING DIGITAL MEDIA DATA WITH PREDICTION INFORMATION AND PREDICTION ERROR INFORMATION BEING RESPECTIVELY CARRIED BY DIFFERENT BIT STREAM SECTIONS

(75) Inventor: Kun-Bin Lee, Taipei (TW)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 997 days.

(21) Appl. No.: 12/249,963

(22) Filed: Oct. 12, 2008

(65) Prior Publication Data

US 2010/0091857 A1    Apr. 15, 2010

(51) Int. Cl.
*H04N 11/02* (2006.01)
(52) U.S. Cl. .............................. 375/240.12; 375/240.13
(58) Field of Classification Search . 375/240.12–240.13
See application file for complete search history.

(56) References Cited

U.S. PATENT DOCUMENTS

| | | | | |
|---|---|---|---|---|
| 4,802,006 A | * | 1/1989 | Iinuma et al. | 375/240.14 |
| 4,827,337 A | * | 5/1989 | Yasuda | 375/240.12 |
| 5,089,889 A | * | 2/1992 | Sugiyama | 375/240.12 |
| 5,353,062 A | * | 10/1994 | Maeda | 375/240.14 |
| 5,418,569 A | * | 5/1995 | Ando | 375/240.04 |
| 5,777,677 A | | 7/1998 | Linzer et al. | |
| 6,310,919 B1 | | 10/2001 | Florencio | |
| 6,792,149 B1 | | 9/2004 | Florencio | |
| 7,257,157 B2 | * | 8/2007 | Cheung | 375/240 |
| 7,792,188 B2 | * | 9/2010 | Tong et al. | 375/240 |
| 7,876,834 B2 | * | 1/2011 | Chujoh et al. | 375/240.25 |
| 2005/0013376 A1 | * | 1/2005 | Dattani et al. | 375/240.24 |
| 2007/0110325 A1 | * | 5/2007 | Lee | 382/236 |

* cited by examiner

*Primary Examiner* — Ponnoreay Pich
(74) *Attorney, Agent, or Firm* — Winston Hsu; Scott Margo (57) ABSTRACT

A method for encoding digital media data includes deriving a portion of prediction information and a portion of prediction error information of the digital media data, and encoding the digital media data into a bit stream. The bit stream comprises a first bit stream section and a second bit stream section that respectively carry the portion of prediction information and the portion of prediction error information. In addition, within the bit stream, the portion of prediction information and the portion of prediction error information are not carried in the same macroblock (MB) or the same sub-unit of an MB. A method for decoding encoded digital media data and a method for coding digital media data and a method for processing bit stream of digital media data are also provided.

21 Claims, 12 Drawing Sheets

| Reference frame index block_a, block_b | Conventional te(v) encoding approaches, where code = 1, 010, 011, 00100 for index = 0, 1, 2, 3, respectively | Encoding approaches of this embodiment |
|---|---|---|
| 0,0 | 1,1 | 1 |
| 0,1 | 1,010 | 010 |
| 0,2 | 1,011 | 011 |
| 1,0 | 010,1 | 00100 |
| 2,0 | 011,1 | 00101 |
| 1,1 | 010,010 | 00110 |
| 1,2 | 010,011 | 00111 |
| 2,1 | 011,010 | 0001000 |
| 2,2 | 011,011 | 0001001 |
| 0,3 | 1,00100 | 0001010 |
| 3,0 | 00100,1 | 0001011 |
| 1,3 | 010,00100 | 0001100 |
| 3,1 | 00100,010 | 0001101 |
| 2,3 | 011,00100 | 0001110 |
| 3,2 | 00100,011 | 0001111 |
| 3,3 | 00100,00100 | 000010000 |

| Reference frame index block_a, block_b | Conventional te(v) encoding approaches, where code = 1, 010, 011 for index = 0, 1, 2, respectively | Encoding approaches of this embodiment |
|---|---|---|
| 0,0 | 1,1 | 1 |
| 0,1 | 1,010 | 0000 |
| 0,2 | 1,011 | 0001 |
| 1,0 | 010,1 | 0010 |
| 2,0 | 011,1 | 0011 |
| 1,1 | 010,010 | 0100 |
| 1,2 | 010,011 | 0101 |
| 2,1 | 011,010 | 0110 |
| 2,2 | 011,011 | 0111 |

FIG. 9

| Reference frame index block_a, block_b | Conventional te(v) encoding approaches, where code = 1, 010, 011, 00100 for index = 0, 1, 2, 3, respectively | Encoding approaches of this embodiment |
|---|---|---|
| 0,0 | 1,1 | 1 |
| 0,1 | 1,010 | 010 |
| 0,2 | 1,011 | 011 |
| 1,0 | 010,1 | 00100 |
| 2,0 | 011,1 | 00101 |
| 1,1 | 010,010 | 00110 |
| 1,2 | 010,011 | 00111 |
| 2,1 | 011,010 | 0001000 |
| 2,2 | 011,011 | 0001001 |
| 0,3 | 1,00100 | 0001010 |
| 3,0 | 00100,1 | 0001011 |
| 1,3 | 010,00100 | 0001100 |
| 3,1 | 00100,010 | 0001101 |
| 2,3 | 011,00100 | 0001110 |
| 3,2 | 00100,011 | 0001111 |
| 3,3 | 00100,00100 | 000010000 |

FIG. 10

| Bit string form | Range of codeNum |
|---|---|
| 1 | 0 |
| 0 1 $X_0$ | 1-2 |
| 0 0 1 $X_1$ $X_0$ | 3-6 |
| 0 0 0 1 $X_2$ $X_1$ $X_0$ | 7-14 |
| 0 0 0 0 1 $X_3$ $X_2$ $X_1$ $X_0$ | 15-30 |
| 0 0 0 0 0 1 $X_4$ $X_3$ $X_2$ $X_1$ $X_0$ | 31-62 |
| ... | ... |

FIG. 11

| Reference frame index block_a, block_b | Conventional te(v) encoding approaches, where code = 1, 010, 011, 00100 for index = 0, 1, 2, 3, respectively | Encoding approaches of this variation |
|---|---|---|
| 0,0 | 1,1 | 1 |
| 0,1 | 1,010 | 010 |
| 0,2 | 1,011 | 00100 |
| 1,0 | 010,1 | 011 |
| 2,0 | 011,1 | 00101 |
| 1,1 | 010,010 | 00110 |
| 1,2 | 010,011 | 00111 |
| 2,1 | 011,010 | 0001000 |
| 2,2 | 011,011 | 0001001 |
| 0,3 | 1,00100 | 0001010 |
| 3,0 | 00100,1 | 0001011 |
| 1,3 | 010,00100 | 0001100 |
| 3,1 | 00100,010 | 0001101 |
| 2,3 | 011,00100 | 0001110 |
| 3,2 | 00100,011 | 0001111 |
| 3,3 | 00100,00100 | 000010000 |

FIG. 12

METHODS FOR CODING DIGITAL MEDIA DATA WITH PREDICTION INFORMATION AND PREDICTION ERROR INFORMATION BEING RESPECTIVELY CARRIED BY DIFFERENT BIT STREAM SECTIONS

BACKGROUND

The present invention relates to multiple reference frame architecture for video coding, and more particularly, to methods for coding (encoding or decoding) digital media data with prediction information and prediction error information being respectively carried by different bit stream sections.

Regarding a multiple reference frame architecture (for example, an apparatus complying with H.264 specifications), some problems such as complicated memory access behavior and a high memory access rate of a main memory are introduced while multi-frame motion compensation is performed, where the main memory can be a dynamic random access memory (DRAM) to be accessed by a processor of the apparatus. Typically, the processor and the main memory are respectively positioned in different chips within the apparatus, so the memory bandwidth of the main memory may be insufficient due to the complicated memory access behavior and/or the high memory access rate of the main memory.

According to the related art, some suggestions with regard to a reduction of the corresponding memory requirement (e.g., the memory requirement of the DRAM) are proposed in order to solve some of the problems mentioned above. One suggestion comprises scaling decoded pictures, however, the picture quality is usually degraded through scaling. Another suggestion is compressing decoded pictures in a simpler way without randomly accessing a macroblock (MB). According to this suggestion, however, it is also very hard to prevent the picture quality from being degraded. According to another suggestion, just-in-time decoding of specific frames may be applied, but the corresponding computation load is extremely heavy to cost-efficient hardware architecture.

Figure 1:
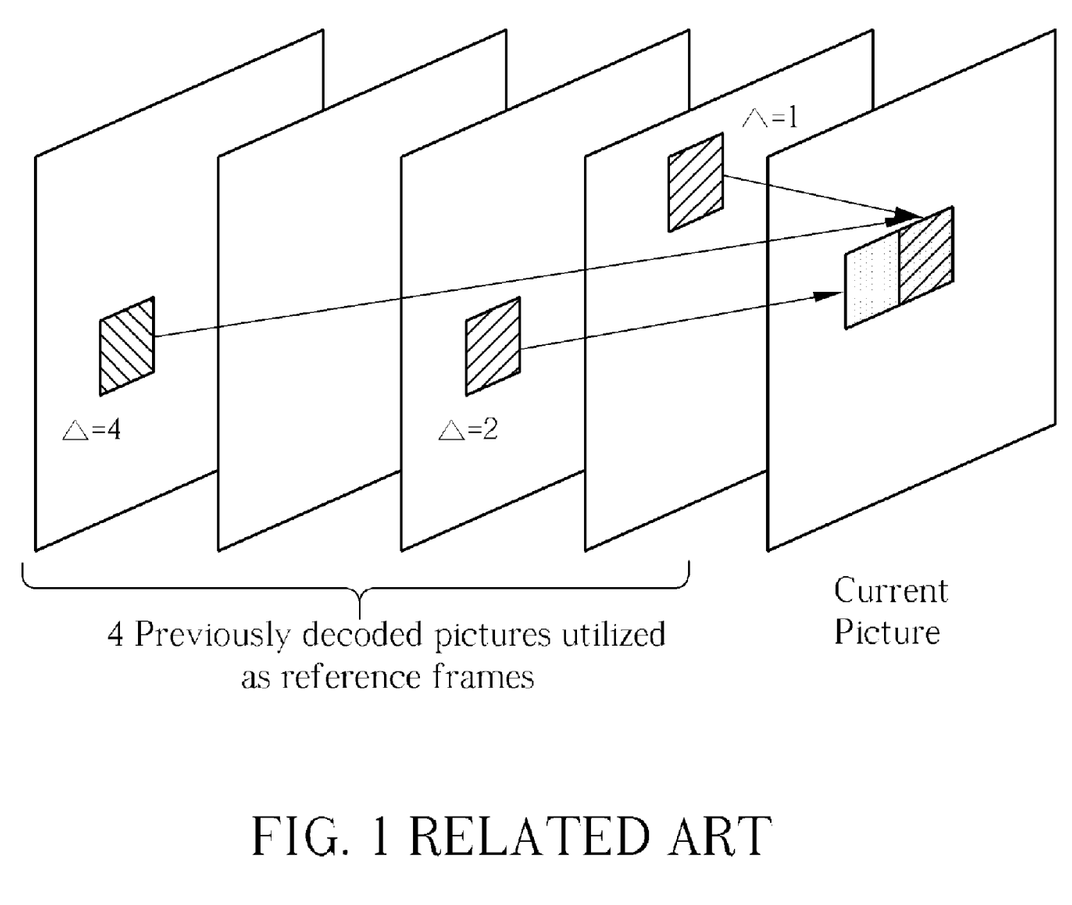
FIG. 1 illustrates a situation where multi-frame motion compensation is performed according to the related art.

As mentioned, the overall performance of an architecture implemented with at least one of the aforementioned suggestions is typically degraded due to some native characteristics of the multi-frame motion compensation. For example, referring to a situation shown in FIG. 1, reference data of an MB may be derived from multiple frames. In addition, more motion vectors and more intra information are involved in contrast to single frame motion compensation. Additionally, some issues related to long-term memory management might be encountered. Thus, according to the related art, even though the goal of reducing the corresponding memory requirement may be achieved, it is hard to prevent introducing unwanted side effects.

Regarding an essential characteristic of the multiple reference frame architecture of the related art, as too much information—such as the MB type, the reference frame list, the motion vector difference(s), the coded block pattern, the transform type, the residual, and so on—are all encoded in the same MB layer, the conventional encoding is certainly imperfect since decoded results may occasionally have redundant information.

More particularly, prediction information (for example, inter-frame information such as motion vector information and reference frame information, or intra-frame information such as information of an intra prediction mode) and prediction error information (for example, information of a coded block pattern or residual information) are encoded in the same MB layer according to a conventional syntax, where each reference frame list is individually encoded, and each reference frame is independent of others. As a result, the multiple reference frame architecture implemented according to the conventional syntax such as that utilized in the procedure 10 shown in FIG. 2 (e.g., the MB layer syntax as shown in H.264 Standard Section 7.3.5) suffers from heavy load. A novel method is therefore required for decreasing the amount of the redundant information mentioned above in order to reduce the heavy load.

SUMMARY

It is therefore an objective of the claimed invention to provide methods for encoding digital media data and to provide related methods, in order to solve the above-mentioned problem.

It is another objective of the claimed invention to provide methods for encoding digital media data and to provide related methods, in order that a higher priority for decoding in a prediction mode (e.g., an intra prediction mode and/or an inter prediction mode) can be easily achieved, and even that the goal of reducing the processing load and/or the memory accessing load of a multiple reference frame architecture can be achieved, where less memory volume and less memory bandwidth are required in contrast to the related art.

It is another objective of the claimed invention to provide methods for encoding digital media data and to provide related methods, in order to provide a new encoding syntax that is better for expressing reference frame index(es) utilized in an inter prediction mode.

It is another objective of the claimed invention to provide methods for encoding digital media data and to provide related methods, in order to provide a practical implementation approach to achieve at least one of the aforementioned objectives.

An exemplary embodiment of a method for encoding digital media data comprises deriving at least a portion of prediction information and at least a portion of prediction error information of the digital media data, and encoding the digital media data into a bit stream where the bit stream comprises a first bit stream section and a second bit stream section that respectively carry the portion of prediction information and the portion of prediction error information. In addition, within the bit stream, the portion of prediction information and the portion of prediction error information are not carried in the same macroblock (MB) or the same sub-unit of an MB.

An exemplary embodiment of a method for decoding encoded digital media data comprises receiving a bit stream representing the encoded digital media data, and decoding the bit stream into digital media data according to at least a portion of prediction information and at least a portion of prediction error information. Here, the bit stream comprises a first bit stream section and a second bit stream section that respectively carry the portion of prediction information and the portion of prediction error information of the digital media data. In addition, within the bit stream, the portion of prediction information and the portion of prediction error information are not carried in the same MB or the same sub-unit of an MB.

An exemplary embodiment of a method for coding digital media data comprises: determining an initial encoding mode for a plurality of macroblocks (MBs) of the digital media data, where according to the initial encoding mode, at least a portion of first information and at least a portion of second information of the MBs of the digital media data are respectively carried by a first bit stream section and a second bit stream section of a bit stream encoded from the digital media data; analyzing statistical information derived from an initial process performed in the initial encoding mode to determine which encoding approach should be utilized for at least a portion of syntax elements; and encoding the digital media data into the bit stream. More particularly, in some embodiments of the present invention, the first information may represent prediction information of the MBs, and the second information may represent prediction error information of the MBs.

An exemplary embodiment of a method for processing bit stream of digital media data comprises: processing a first bit stream section and a second bit stream section that respectively carry at least a portion of prediction information and at least a portion of prediction error information of the digital media data; wherein each bit stream section carries information of more than one minimum coded unit. More particularly, in some embodiments of the present invention, the processing includes decoding or encoding. In addition, in some embodiments of the present invention, the minimum coded unit in a video application is a MB.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention provides methods for encoding digital media data with at least a portion of prediction information and at least a portion of prediction error information being respectively carried by different bit stream sections, and further provides corresponding methods for decoding encoded digital media data with at least a portion of prediction information and at least a portion of prediction error information being respectively carried by different bit stream sections. In particular, the digital media data represents moving pictures, and the methods for encoding the digital media data typically generates a bit stream of the moving pictures, where the encoding/decoding methods of the present invention can be combined when needed.

According to various embodiments of the present invention, a portion of the information that is originally encoded in the same macroblock (MB) layer by utilizing the conventional encoding syntax can be encoded apart from the MB level (e.g., the MB layer). For example, the MB type, the reference frame list, and/or the motion vector difference(s) mentioned above can be encoded not in the same MB layer since at least a portion of the information can be considered as global information among several MBs.

Figure 3:
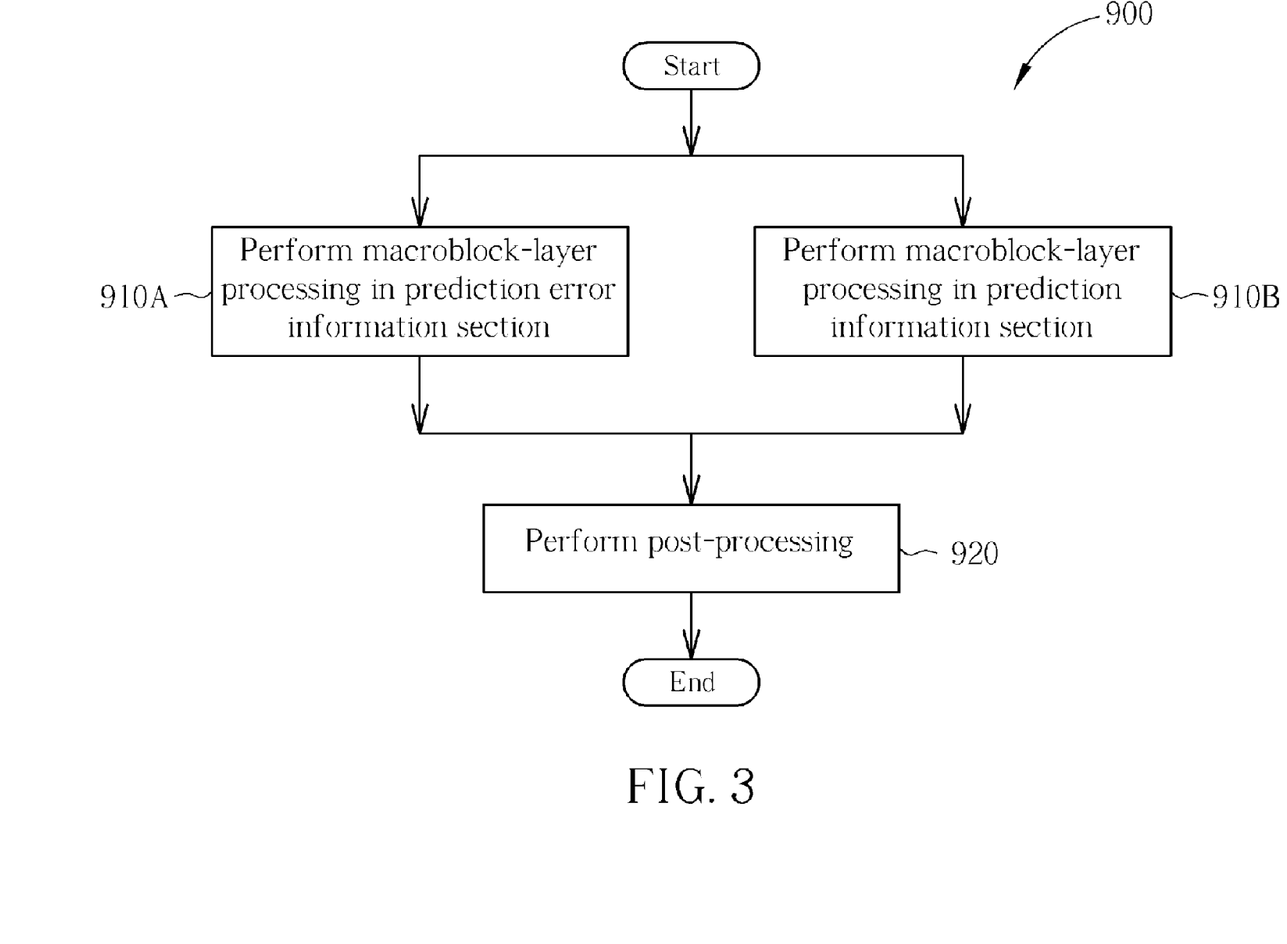
FIG. 3 is a flowchart of a procedure for respectively performing MB-layer processing by utilizing a new syntax in a prediction error information section and a prediction information section according to a first embodiment of the present invention.
Figure 4:
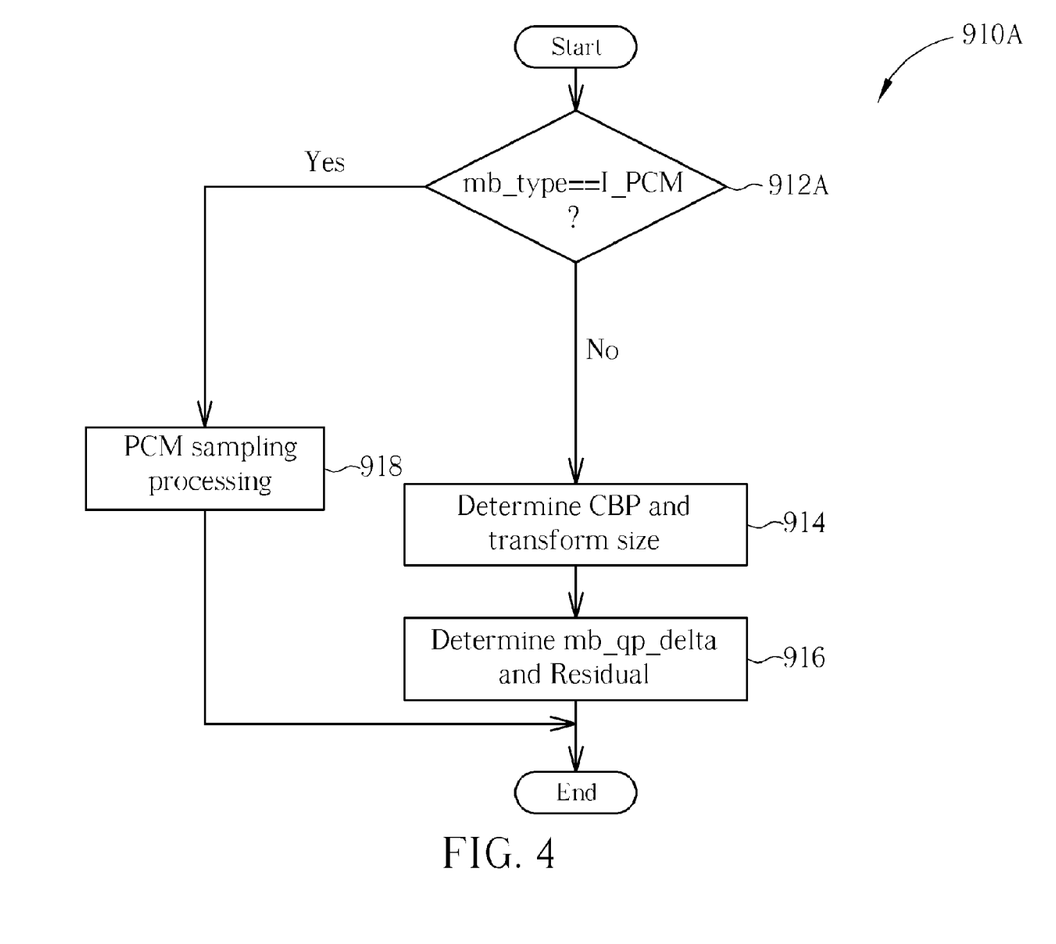
FIG. 4 is a flowchart of a sub-procedure in the left path shown in FIG. 3 according to an embodiment of the present invention.
Figure 5:
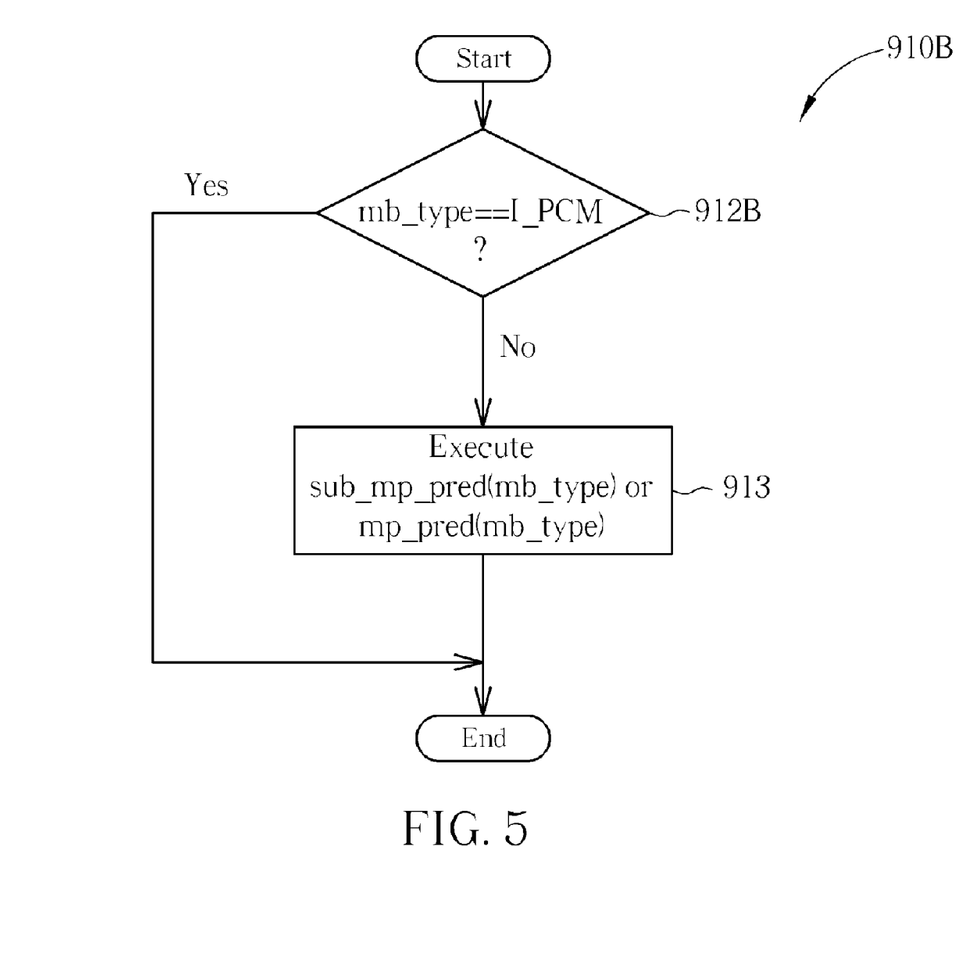
FIG. 5 is a flowchart of a sub-procedure in the right path shown in FIG. 3 according to another embodiment of the present invention.

Please refer to FIG. 3, FIG. 4, and FIG. 5. FIG. 3 is a flowchart of a procedure 900 for respectively performing MB-layer processing by utilizing a new syntax in a prediction error information section and a prediction information section according to a first embodiment of the present invention. FIG. 4 is a flowchart of a sub-procedure in Step 910A shown in FIG. 3 according to an embodiment of the present invention. FIG. 5 is a flowchart of a sub-procedure in Step 910B shown in FIG. 3 according to another embodiment of the present invention. As shown in FIG. 3, Step 910A and Step 910B are executed independently and are not necessary to perform concurrently, and then the post-processing is performed in Step 920.

Figure 2:
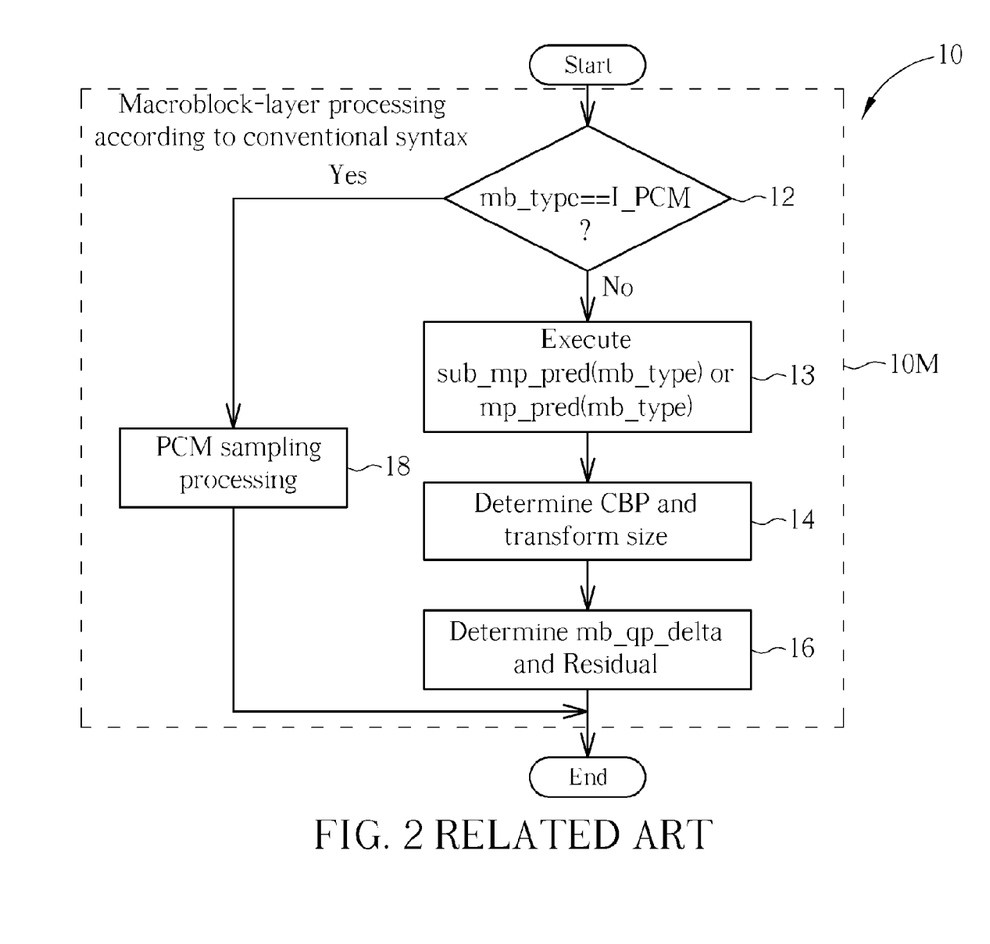
FIG. 2 is a flowchart of a procedure for processing in a macroblock (MB) layer by utilizing a conventional syntax according to the related art.

It should be noted that although Steps 912A, 914, 916, and 918 shown in FIG. 4 correspond to Steps 12, 14, 16, and 18 shown in FIG. 2, respectively, the sub-procedure in Step 910A of the embodiment shown in FIG. 4 differs from the procedure 10 shown in FIG. 2. The MB-layer processing in Step 910A does not include a step for preparing the prediction information (e.g., Step 13 within the MB-layer processing in Step 10M), where it is certainly required to utilize the new syntax (or another new syntax), rather than the conventional syntax. Thus, in Step 912A, when the parameter mb_type is equal to a predetermined value I_PCM representing a certain type of intra-coding, Step 918 is entered in order to perform PCM (Pulse Code Modulation) sampling processing; otherwise, Step 914 is entered in order to determine CBP (i.e. coded_block_pattern, which means coded block pattern) and the transform size, and then information of mb_qp_delta (which means quantization parameter difference between a current and a previous macroblock) and residual information is determined in Step 916.

Similarly, although Steps 912B and 913 shown in FIG. 5 respectively correspond to Steps 12 and 13 shown in FIG. 2, the sub-procedure in Step 910B of the embodiment shown in FIG. 5 differs from the procedure 10 shown in FIG. 2. The MB-layer processing in Step 910B does not include a step for preparing the prediction error information (e.g., Step 14 or Step 16 within the MB-layer processing in Step 10M), where it is certainly required to utilize the new syntax (or another new syntax), rather than the conventional syntax. Thus, in Step 912B, when the parameter mb_type is equal to a predetermined value I_PCM representing a certain type of intra-coding, Step 913 is skipped to end the sub-procedure; otherwise, Step 913 is entered to derive the prediction information.

The prediction error information section and the prediction information section respectively represent two different bit stream sections in a bit stream. In general, in different embodiments of the present invention, the bit stream can be a bit stream to be decoded or a bit stream generated from encoding, where the two bit stream sections in the bit stream correspond to an encoding unit that is greater than an MB. More particularly, the prediction error information section and the prediction information section represent two different bit stream sections in a multiple-MB layer, a slice layer, a picture layer, a group of picture (GOP) layer, or a layer greater than the GOP layer. Here, the term "multiple-MB layer" corresponds to a group comprising a plurality of MBs, and the term "multiple-MB layer" in the above description represents that, in this group, the prediction information of the MBs is gathered together when being encoded, and the prediction error information of the MBs is gathered together when being encoded. As a result, regarding this group, the prediction information and the prediction error information can be respectively decoded. Similarly, when the prediction error information section and the prediction information section represent two different bit stream sections in a slice layer, it means the prediction information of the MBs of a slice is gathered together when being encoded, and the prediction error information of the MBs of the same slice is gathered together when being encoded. As a result, regarding this slice, the prediction information and the prediction error information can be respectively decoded. Similar descriptions for the picture layer, the GOP layer, or the layer greater than the GOP layer are not repeated in detail here.

Thus, in contrast to the related art, at least a portion of prediction information and at least a portion of prediction error information of the digital media data to be encoded do not need to belong to the same MB layer of the same bit stream partition, with the new syntax being utilized. That is, when deriving the prediction information is required, it is unnecessary to derive the prediction error information first since they can be partially or fully independent of the MB-layer processing. In addition, when decoding prediction information of two successive MBs, decoding prediction error information of the two successive MBs is not required.

Figure 6:
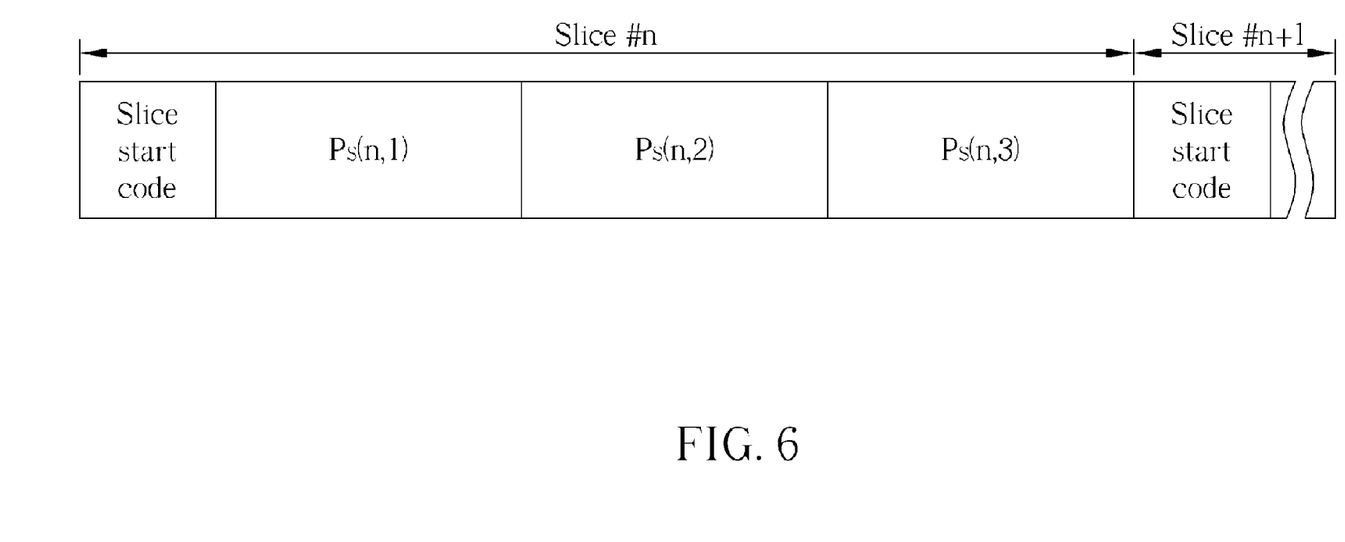
FIG. 6 illustrates a bit stream structure of a bit stream in a slice layer according to a second embodiment of the present invention.

FIG. 6 illustrates a bit stream structure of a bit stream in the slice layer according to a second embodiment of the present invention, where Partition $P_S(n, 1)$ of this embodiment carries information such as slice header information and MB type information. Partitions $P_S(n, 2)$ and $P_S(n, 3)$ respectively represent two respective bit stream sections in the bit stream, such as the aforementioned two bit stream sections.

According to a first implementation choice of this embodiment, Partitions $P_S(n, 2)$ and $P_S(n, 3)$ respectively carry the prediction information (e.g., prediction mode information) and the prediction error information. According to a second implementation choice of this embodiment, Partitions $P_S(n, 2)$ and $P_S(n, 3)$ respectively carry the prediction error information and the prediction information (e.g., prediction mode information).

According to this embodiment, while an encoding apparatus implemented with the present invention methods encodes the digital media data into the bit stream, the encoding apparatus respectively derives at least a portion of prediction information and at least a portion of prediction error information of the digital media data, where the bit stream representing the encoded digital media data comprises the two bit stream sections that respectively carry the portion of prediction information and the portion of prediction error information. Thus, the portion of prediction information and the portion of prediction error information are not carried in the same MB or the same sub-unit of an MB.

In this embodiment, the portion of prediction error information comprises residual information. In addition, the portion of prediction information comprises motion vector information and/or intra prediction information, where at least a portion of the motion vector information comprises reference frame information.

On the other hand, while a decoding apparatus implemented with the present invention methods decodes the encoded digital media data mentioned above, the decoding apparatus receives a bit stream representing the encoded digital media data, where the bit stream comprises the two bit stream sections that respectively carry the portion of prediction information and the portion of prediction error information of the digital media data that is previously encoded into the encoded digital media data.

Regarding I, P, or B slices, intra-coded MBs may exist, where this kind of MB may utilize samples of a current picture as reference. A conventional decoder usually stores information of a current MB that is considered probably useful for decoding the following MBs, causing redundant memory access and unnecessary memory access load. In contrast, referring to FIG. 5, the prediction information (e.g., the prediction mode information) can be independently decoded from the bit stream utilizing a new bit stream structure of the present invention methods (such as that shown in FIG. 6), and the references utilized by all the MBs of the whole slice are known accordingly. Thus, the decoding apparatus of this embodiment determines whether to temporarily store related information of a current MB according to a decoded result of the intra prediction information, where the related information of the current MB is utilized in an intra prediction mode for decoding another MB to be processed later. Here, only necessary information is temporarily stored, causing a reduced memory access load, and therefore, enhanced performance in contrast to the related art.

Regarding P or B slices, inter-coded MBs may exist, where this kind of MB may utilize samples of another picture as reference. Referring to FIG. 5, as the prediction information (e.g., the prediction mode information) can be independently decoded from the bit stream utilizing a new bit stream structure of the present invention methods (such as the bit stream structure shown in FIG. 6), and because the references utilized by all the MBs of the whole slice are known accordingly, the decoding apparatus of this embodiment determines whether to temporarily store related information of a current MB according to a decoded result of the inter prediction information. The related information of the current MB is utilized in an inter prediction mode for decoding another MB to be processed later. Here, some pre-processing for the references can be performed in advance in order to prevent from abrupt increase of processing/memory accessing load in the entire decoding process. For example, as some reference data in the references may be compressed, the decoding apparatus decompresses the references to be utilized or some regions in the references to be utilized in advance, causing enhanced performance in contrast to the related art.

According to a variation of this embodiment, the decoding apparatus implemented with the present invention methods further determines whether to perform post-processing on a reconstructed MB according to a decoded result of the inter prediction information.

Figure 7:
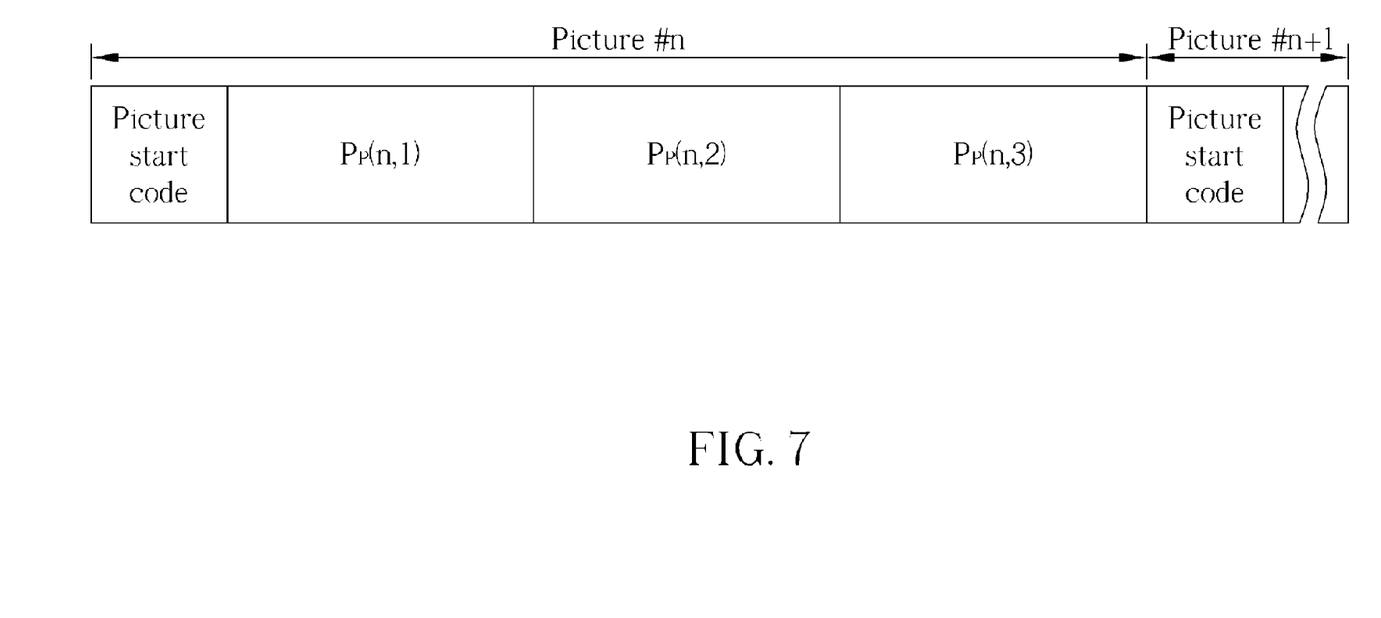
FIG. 7 illustrates a bit stream structure of a bit stream in a picture layer according to a third embodiment of the present invention.

FIG. 7 illustrates a bit stream structure of a bit stream in the picture layer according to a third embodiment of the present invention, where this embodiment is a variation of the second embodiment. The slice layer is replaced with the picture layer, and Partitions $P_S(n, 1)$, $P_S(n, 2)$, and $P_S(n, 3)$ of the slice layer are respectively replaced with Partitions $P_P(n, 1)$, $P_P(n, 2)$, and $P_P(n, 3)$ of the picture layer, and Partitions $P_P(n, 2)$ and $P_P(n, 3)$ represent the aforementioned bit stream sections. According to a first implementation choice of this embodiment, Partitions $P_P(n, 2)$ and $P_P(n, 3)$ carry the prediction information (e.g., prediction mode information) and the prediction error information, respectively. According to a second implementation choice of this embodiment, Partitions $P_P(n, 2)$ and $P_P(n, 3)$ carry the prediction error information and the prediction information (e.g., prediction mode information), respectively. The partitions in this embodiment have their respective slice layer information.

Figure 8:
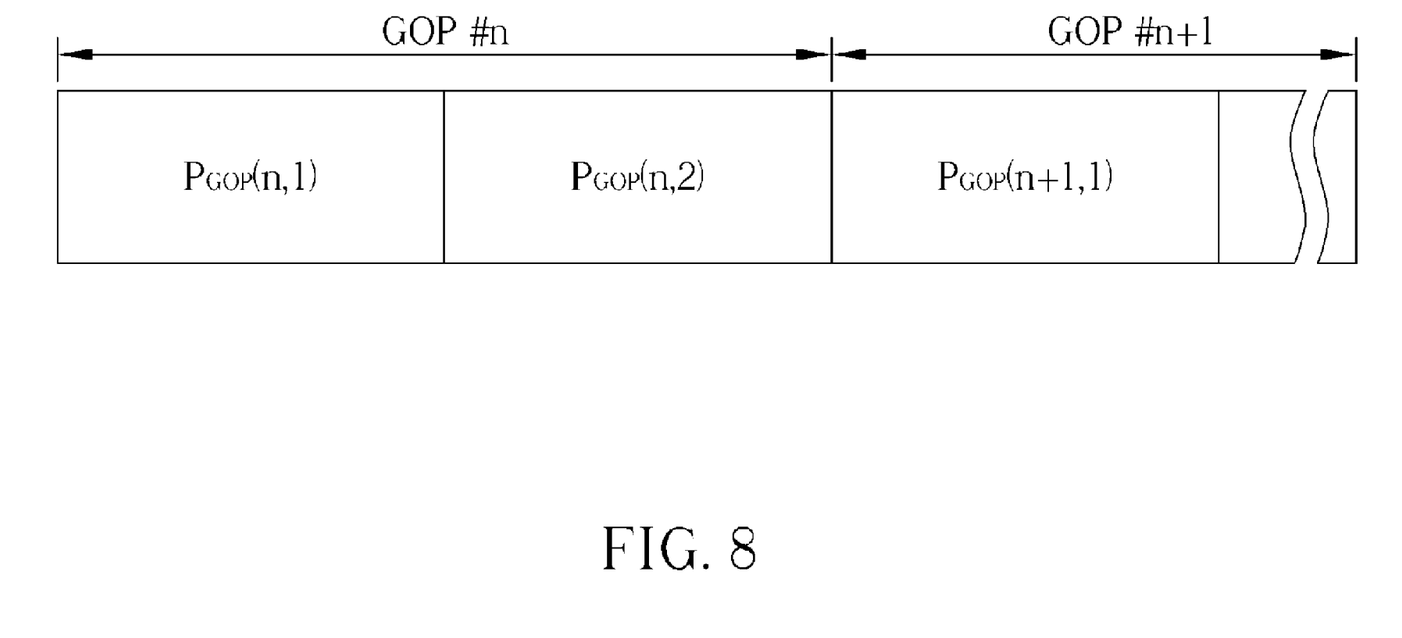
FIG. 8 illustrates a bit stream structure of a bit stream in a group of picture (GOP) layer according to a fourth embodiment of the present invention.

FIG. 8 illustrates a bit stream structure of a bit stream in the GOP layer according to a fourth embodiment of the present invention, where this embodiment is another variation of the second embodiment. The slice layer is replaced with the GOP layer, and Partitions $P_S(n, 2)$ and $P_S(n, 3)$ of the slice layer are respectively replaced with Partitions $P_{GOP}(n, 1)$ and $P_{GOP}(n, 2)$ of the GOP layer, and Partitions $P_{GOP}(n, 1)$ and $P_{GOP}(n, 2)$ represent the aforementioned bit stream sections. According to a first implementation choice of this embodiment, Partitions $P_{GOP}(n, 1)$ and $P_{GOP}(n, 2)$ respectively carry the prediction information (e.g., prediction mode information) and the prediction error information. According to a second implementation choice of this embodiment, Partitions $P_{GOP}(n, 1)$ and $P_{GOP}(n, 2)$ respectively carry the prediction error information and the prediction information (e.g., prediction mode information). The partitions in this embodiment have their respective picture layer information, slice layer information, and so on.

In the case where a specific video encoding standard permits an inter-coded MB to reference multiple reference frames, the present invention methods (in particular, this embodiment) can be applied to the specific video encoding standard conveniently. Since the references (e.g., the reference pictures) utilized by all the pictures of the entire GOP are known, the need of utilizing the external memory and the corresponding memory access load of the decoding apparatus of this embodiment can be further reduced, causing high feasibility and/or high flexibility in implementing the present invention methods according to the specific video encoding standard.

For example, except a specific region, the other regions within a picture Pic(m) are not referenced. In practice, when the picture Pic(m) has been played back, the decoding apparatus of this embodiment simply stores the related information of the specific region temporarily, rather than the data of the entire picture Pic(m). Similarly, when the picture Pic(m) is no longer needed other than for being utilized as a reference frame, the decoding apparatus of this embodiment simply stores the related information of the specific region temporarily, rather than the data of the whole picture Pic(m).

According to another variation of the second embodiment, the slice layer for arranging the bit stream sections is replaced with a sequence for arranging the bit stream sections, with one bit stream section carrying the prediction information (e.g., prediction mode information) and the other bit stream section carrying the prediction error information. Similar descriptions are not repeated for this variation.

Regarding the new syntax mentioned above, the present invention methods provide better encoding approaches for expressing the reference frame indexes (i.e., the indexes of the reference frames) utilized in an inter prediction mode than those implemented according to the conventional syntax. In a fifth embodiment, a processing apparatus can be utilized for encoding the digital media data into the bit stream, where this embodiment is a variation of the first embodiment. The processing apparatus can further be utilized for decoding the bit stream or the reproduced form of the bit stream into digital media data when needed. For example, the processing apparatus is a microprocessor for performing image processing in a digital video recorder.

According to the fifth embodiment, when encoding digital media data into a bit stream, the processing apparatus may determine an initial encoding mode for a plurality of MBs of the digital media data first, where the plurality of MBs may represent a picture, a slice, or a group of blocks, depending on different implementation choices of this embodiment. According to the initial encoding mode, at least a portion of prediction information and at least a portion of prediction error information of the MBs of the digital media data are respectively carried by two different bit stream sections such as the aforementioned two bit stream sections. In addition, the processing apparatus derives certain statistical information from an initial process performed in the initial encoding mode. By analyzing the statistical information, the processing apparatus determines which encoding approach (e.g., entropy encoding approach) should be utilized for at least a portion of the syntax elements. For example, the syntax elements comprise the prediction information and/or the prediction error information. In another example, the syntax elements comprise reference frame information, motion vector information, and/or residual non-zero information.

In this embodiment, the processing apparatus determines an encoding approach for a reference frame according to the statistical information, where the encoding approach for the reference frame is carried in a header ahead of the two bit stream sections. Typically, the encoding approach is selected from a plurality of encoding approaches, and an exemplary encoding approach depends on the number of reference frame indexes utilized in an MB.

In practice, the encoding approaches depend on the number of reference frames that are utilized. More specifically, the processing apparatus determines different encoding approaches for situations where 1, 2, 3, . . . , and k reference frames are utilized, respectively. For example, different coding schemes can be utilized for these various situations. It should be noted that according to this embodiment, the number of reference frames utilized in forward prediction and the number of reference frames utilized in backward prediction are individually calculated for statistical information. Taking a situation where one reference frame is utilized in the forward prediction and one reference frame is utilized in the backward prediction as an example, the encoding approach for either the forward prediction or the backward prediction is determined by considering the situation where one reference frame is utilized.

In addition, the encoding approaches depend on the number of reference frame indexes that are utilized in a current MB. More specifically, as the two bit stream sections (e.g., those in one of the embodiments shown in FIG. 6, FIG. 7, and FIG. 8) are utilized for respectively carrying the portion of prediction information and the portion of prediction error information, the processing apparatus may derive the maximal possible number of reference frame indexes that an MB utilizes. For example, the MB partition of a specific MB is 16 by 8 or 8 by 16. If the specific MB is in a P picture, there should be only two reference frame indexes. If the specific MB is in a B picture, there should be four reference frame indexes.

Figure 9:
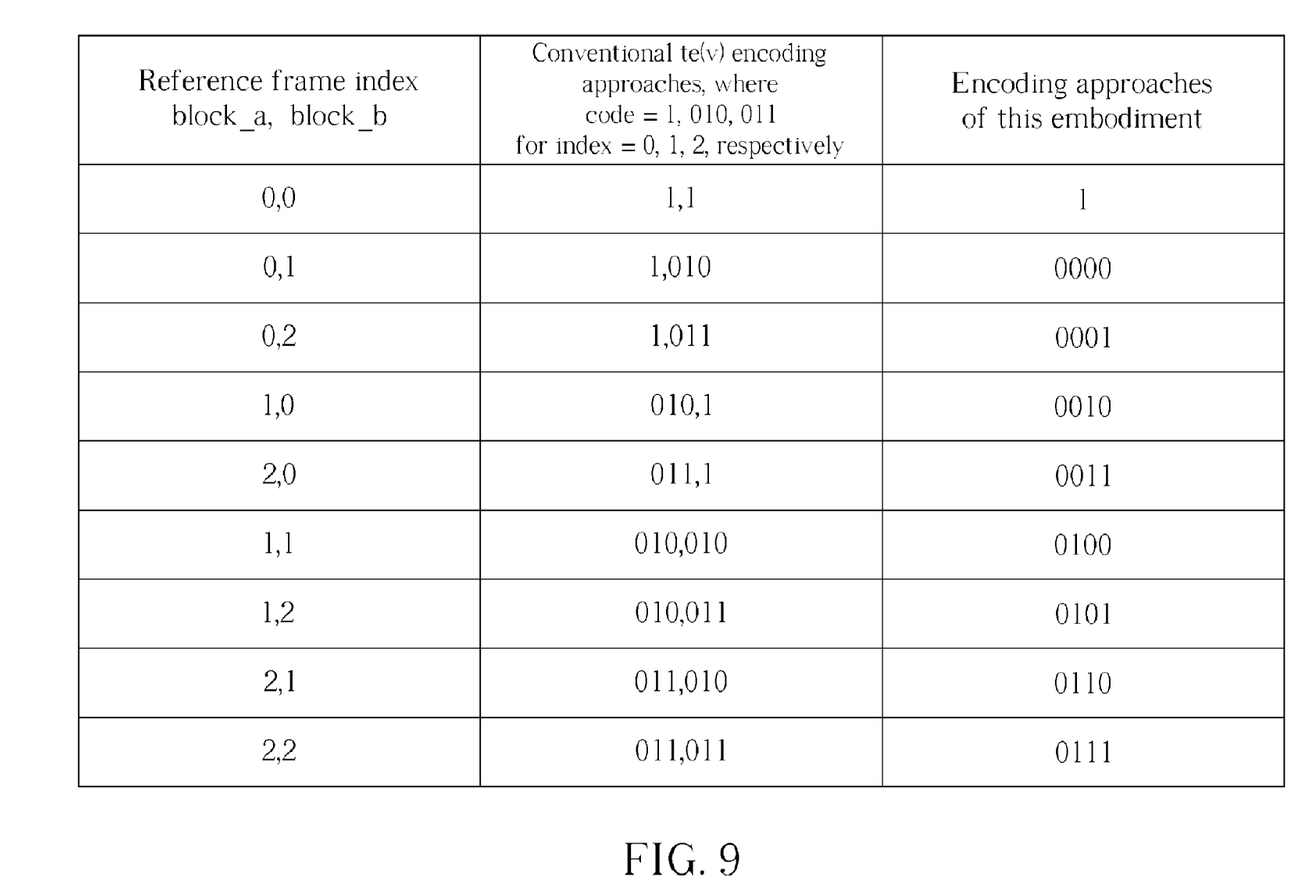
FIG. 9 and FIG. 10 illustrate implementation details of related encoding approaches regarding a situation where a specific MB is in a P picture according to various implementation choices of a fifth embodiment, where the encoding approaches of this embodiment are illustrated in contrast to conventional encoding approaches of the related art.
Figure 10:
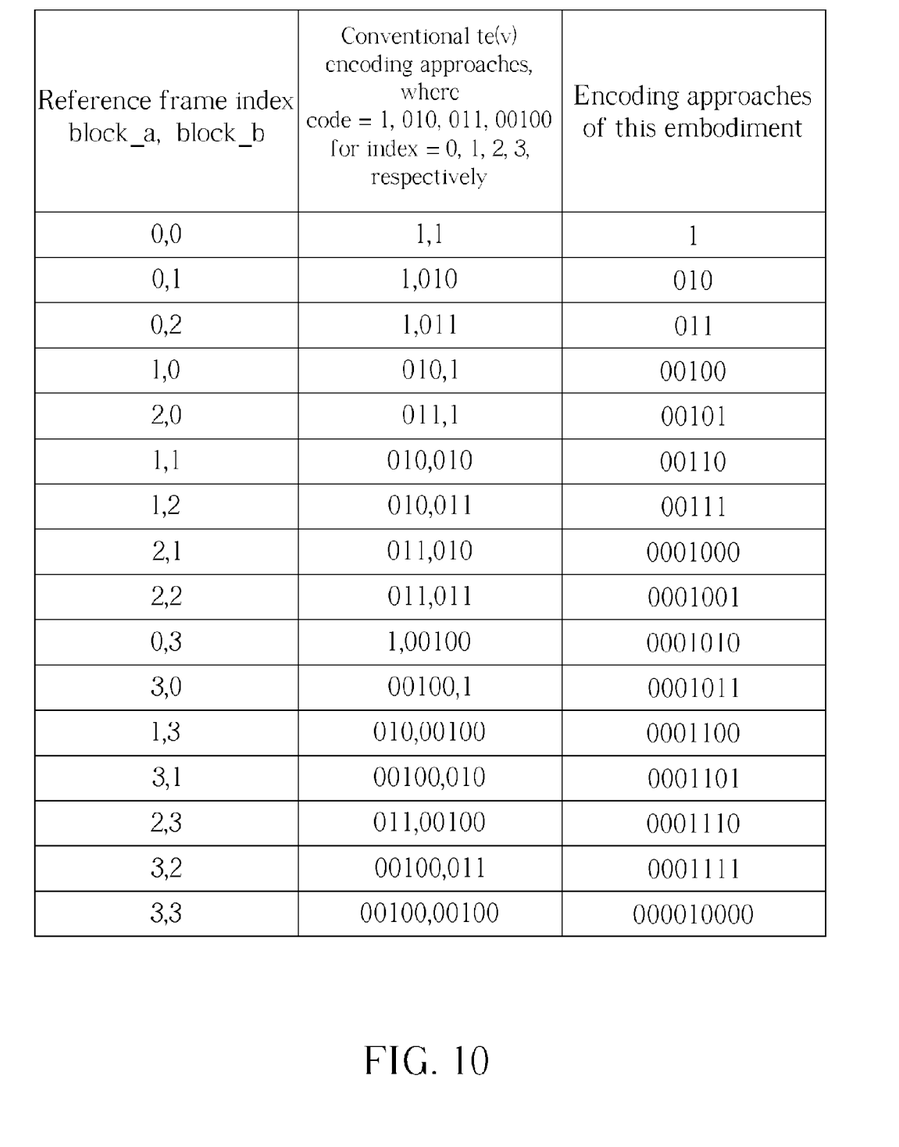

Taking the situation where the specific MB is in a P picture as an example, please refer to FIG. 9 and FIG. 10 for implementation details of related encoding approaches according to various implementation choices of this embodiment, where the encoding approaches of this embodiment are illustrated in contrast to conventional encoding approaches of the related art. According to a first implementation choice of this embodiment, when only three reference frames are utilized, there are nine respective cases as listed in the nine data rows shown in FIG. 9, within the mode in which two reference frame indexes are utilized. According to a second implementation choice of this embodiment, when only four reference frames are utilized, there are sixteen respective cases as listed in the sixteen data rows shown in FIG. 10, within the mode in which two reference frame indexes are utilized.

Figure 11:
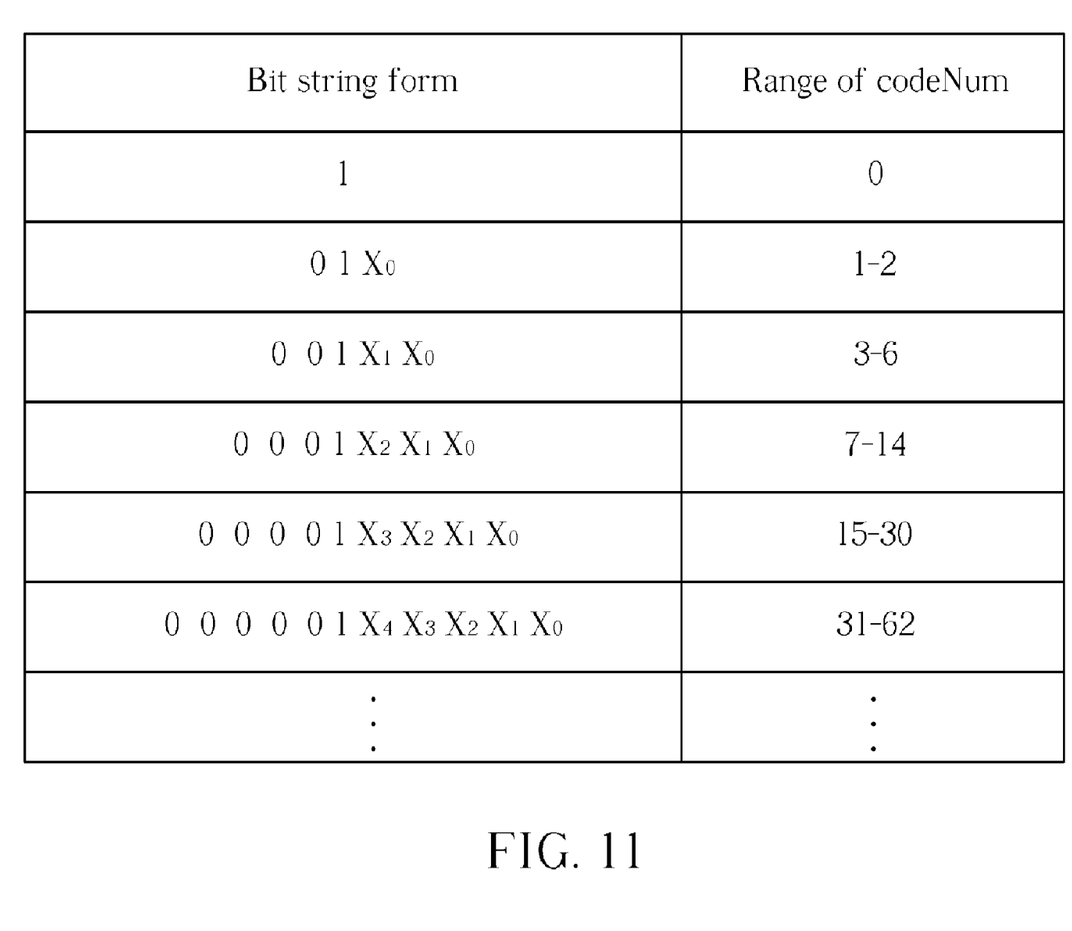
FIG. 11 illustrates a plurality of generalized bit stream forms of the codes utilized in the encoding approaches shown in FIG. 10 according to another implementation choice of the fifth embodiment.

FIG. 11 further illustrates a plurality of generalized bit stream forms of the codes utilized in the encoding approaches shown in FIG. 10 according to a third implementation choice of the fifth embodiment. Regarding the codes of the encoding approaches shown in FIG. 10, the first code "1" corresponds to the bit stream form "1" shown in FIG. 11, and the codes "010" and "011" correspond to the bit stream form "0 1 $X_0$" shown in FIG. 11. Likewise, the codes "00100", "00101", "00110", and "00111" correspond to the bit stream form "0 0 1 $X_1$ $X_0$" shown in FIG. 11, the codes "0001000", "0001001", ..., and "0001111" correspond to the bit stream form "0 0 0 1 $X_2$ $X_1$ $X_0$" shown in FIG. 11, and so on. Please note that each bit stream form shown in FIG. 11 is expressed as the binary digits of a code number codeNum of the corresponding code (s) of the encoding approaches shown in FIG. 10, where the ranges of the code number codeNum for respective bit stream forms are listed as shown in FIG. 11.

Figure 12:
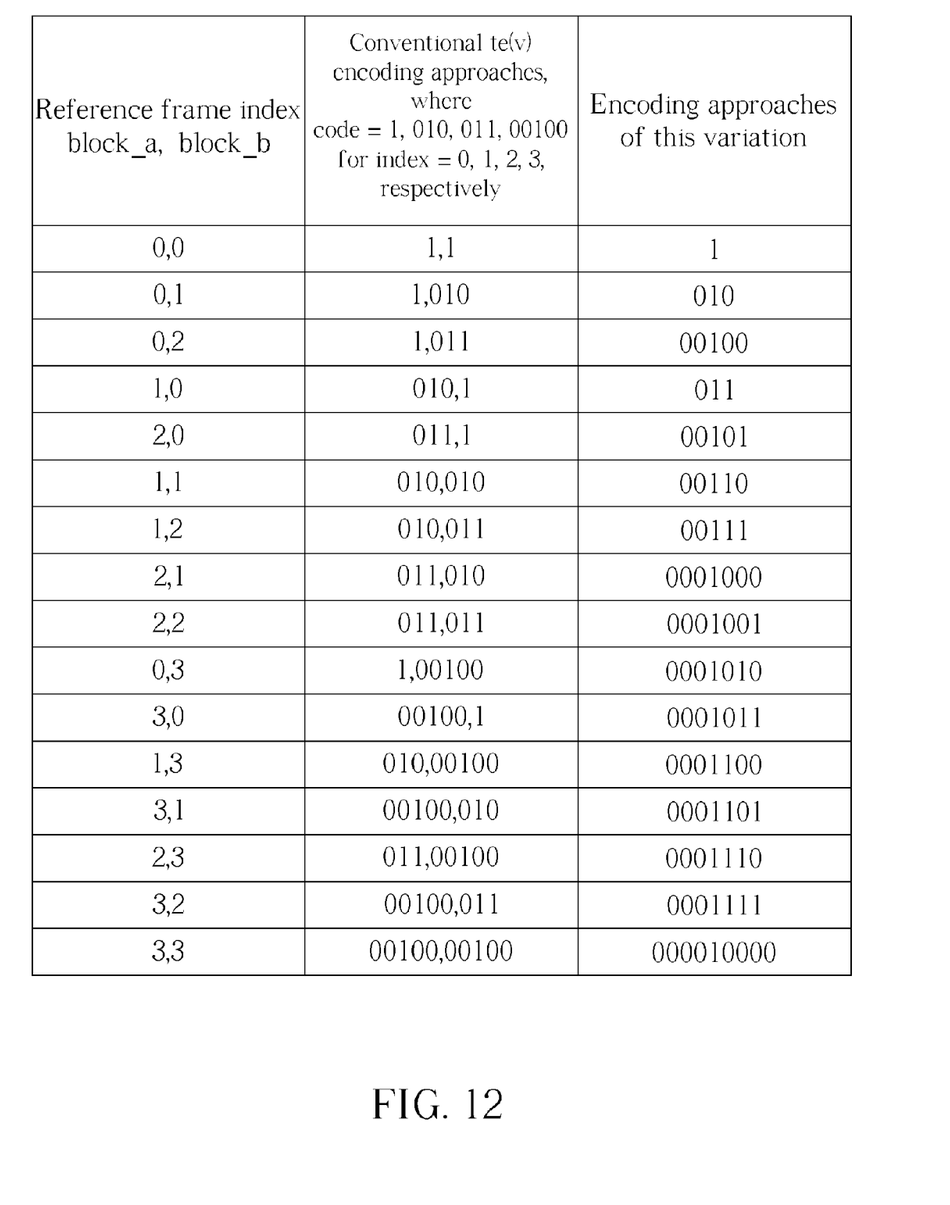
FIG. 12 illustrates implementation details of related encoding approaches regarding a situation where a specific MB is in a P picture according to a variation of the fifth embodiment, where the encoding approaches of this variation are illustrated in contrast to conventional encoding approaches of the related art.

FIG. 12 illustrates implementation details of related encoding approaches regarding a situation where a specific MB is in a P picture according to a variation of the fifth embodiment, where the encoding approaches of this variation are illustrated in contrast to conventional encoding approaches of the related art. According to this variation, the encoding approaches are adjusted from those in the fifth embodiment according to certain probability values predicted by the processing apparatus. For example, when reference frame indexes (block_a, block_b) are equal to (0, 2), the corresponding encoding approach provides the code "00100", which is a five-bit code. In addition, when reference frame indexes (block_a, block_b) are equal to (1, 0), the corresponding encoding approach provides the code "011", which is a three-bit code.

Although the fifth embodiment and the variation shown in FIG. 12 are described with CAVLC entropy encoding, this is not a limitation of the present invention. According to other variations of the fifth embodiment, other kinds of entropy encoding can be utilized for replacing the CAVLC entropy encoding.

Those skilled in the art will readily observe that numerous modifications and alterations of the device and method may be made while retaining the teachings of the invention.

What is claimed is:

1. A method for encoding digital media data, the method comprising:
    deriving at least a portion of prediction information and at least a portion of prediction error information of the digital media data; and
    encoding the digital media data into a bit stream, wherein the bit stream comprises a first bit stream section and a second bit stream section that respectively carry the portion of prediction information and the portion of prediction error information;
    wherein within the bit stream, the portion of prediction information and the portion of prediction error information are not carried in the same macroblock (MB) or the same sub-unit of an MB.

2. The method of claim 1, wherein the portion of prediction error information comprises residual information.

3. The method of claim 1, wherein the portion of prediction information comprises inter prediction information or intra prediction information.

4. The method of claim 3, wherein at least a portion of the inter prediction information comprises reference frame information.

5. A method for decoding encoded digital media data, the method comprising:
    receiving a bit stream representing the encoded digital media data, wherein the bit stream comprises a first bit stream section and a second bit stream section that respectively carry at least a portion of prediction information and at least a portion of prediction error information of digital media data; and
    decoding the bit stream into digital media data according to the portion of prediction information and the portion of prediction error information;
wherein within the bit stream, the portion of prediction information and the portion of prediction error information are not carried in the same macroblock (MB) or the same sub-unit of an MB.

6. The method of claim 5, wherein the portion of prediction error information comprises residual information.

7. The method of claim 5, wherein the portion of prediction information comprises inter prediction information or intra prediction information.

8. The method of claim 7, wherein at least a portion of the inter prediction information comprises reference frame information.

9. The method of claim 7, further comprising:
    determining whether to temporarily store related information of a macroblock (MB) according to a decoded result of the intra prediction information, wherein the related information of the MB is utilized in an intra prediction mode for decoding another MB; and
    storing the related information of the MB according to the determined result.

10. The method of claim 7, further comprising:
    determining whether to temporarily store related information of a macroblock (MB) according to a decoded result of the inter prediction information, wherein the related information of the MB is utilized in an inter prediction mode for decoding another MB; and storing the related information of the MB according to the determined result.

11. The method of claim 7, further comprising:
determining whether to perform post-processing on a reconstructed macroblock (MB) according to a decoded result of the inter prediction information; and
performing post-processing on the reconstructed MB according to the determined result.

12. The method of claim 5, wherein when decoding prediction information of two successive macroblocks (MBs), decoding prediction error information of the two successive MBs is not required.

13. A method for coding digital media data, the method comprising:
determining an initial encoding mode for a plurality of macroblocks (MBs) of the digital media data, wherein according to the initial encoding mode, at least a portion of first information and at least a portion of second information of the MBs of the digital media data are respectively carried by a first bit stream section and a second bit stream section of a bit stream encoded from the digital media data;
analyzing statistical information derived from an initial process performed in the initial encoding mode to determine which encoding approach should be utilized for at least a portion of syntax elements; and
encoding the digital media data into the bit stream;
wherein the first information represents prediction information of the MBs, and the second information represents prediction error information of the MBs.

14. The method of claim 13, wherein in the step of determining the initial encoding mode for the plurality of MBs of the digital media data, the plurality of MBs represents a picture, a slice, or a group of blocks.

15. The method of claim 13, wherein the syntax elements comprise the prediction information and/or the prediction error information.

16. The method of claim 13, wherein the syntax elements comprise reference frame information, motion vector information, and/or residual non-zero information.

17. The method of claim 13, wherein an encoding approach for a reference frame is determined according to the statistical information, and the encoding approach for the reference frame is carried in a header ahead of the first bit stream section and the second bit stream section.

18. The method of claim 13, further comprising:
determining an encoding approach for a reference frame according to the statistical information, wherein the encoding approach is selected from a plurality of encoding approaches, and an encoding approach depends on the number of reference frame indexes utilized in an MB.

19. The method of claim 13, further comprising:
dynamically determining an index of a reference frame according to the statistical information, wherein the smallest index dynamically corresponds to the reference frame that is most frequently referenced.

20. The method of claim 13, further comprising:
determining an index of a reference frame according to the statistical information, wherein regarding a prediction direction, when only one reference frame is utilized, the index of the one reference frame is carried in a header ahead of the first bit stream section and the second bit stream section.

21. The method of claim 13, further comprising:
determining an index of a reference frame according to the statistical information, wherein regarding a prediction direction, when only two or a couple of reference frames are utilized, the indexes of the two or the couple of reference frames are carried in a header ahead of the first bit stream section and the second bit stream section; and
within each block that utilizes one of the reference frames along the prediction direction, utilizing a binary symbol to represent which reference frame is referenced.

* * * * *